(12) United States Patent
Nishimura et al.

(10) Patent No.: US 9,896,094 B2
(45) Date of Patent: Feb. 20, 2018

(54) COLLISION AVOIDANCE CONTROL SYSTEM AND CONTROL METHOD

(71) Applicant: TOYOTA JIDOSHA KABUSHIKI KAISHA, Toyota-shi, Aichi-ken (JP)

(72) Inventors: Motoki Nishimura, Susono (JP); Shinji Igarashi, Susono (JP); Kotaro Saiki, Susono (JP)

(73) Assignee: TOYOTA JIDOSHA KABUSHIKI KAISHA, Toyota-shi, Aichi-ken (JP)

(*) Notice: Subject to any disclaimer, the term of this patent is extended or adjusted under 35 U.S.C. 154(b) by 32 days.

(21) Appl. No.: 15/000,802

(22) Filed: Jan. 19, 2016

(65) Prior Publication Data

US 2016/0207534 A1   Jul. 21, 2016

(30) Foreign Application Priority Data

Jan. 20, 2015 (JP) ................. 2015-008705

(51) Int. Cl.
| | |
|---|---|
| *B60W 30/095* | (2012.01) |
| *B60W 30/09* | (2012.01) |
| *B60W 50/14* | (2012.01) |
| *B60W 30/18* | (2012.01) |
| *B60W 50/00* | (2006.01) |

(52) U.S. Cl.
CPC ......... *B60W 30/09* (2013.01); *B60W 30/095* (2013.01); *B60W 30/0956* (2013.01); *B60W 30/18145* (2013.01); *B60W 50/14* (2013.01); *B60W 2050/0062* (2013.01); *B60W 2520/10* (2013.01); *B60W 2520/105* (2013.01); *B60W 2550/10* (2013.01); *B60W 2550/146* (2013.01); *B60W 2550/30* (2013.01)

(58) Field of Classification Search
None
See application file for complete search history.

(56) References Cited

FOREIGN PATENT DOCUMENTS

JP   2008-137396 A   6/2008

*Primary Examiner* — Rami Khatib
*Assistant Examiner* — Gerrad A Foster
(74) *Attorney, Agent, or Firm* — Sughrue Mion, PLLC (57) ABSTRACT

A collision avoidance control system includes an ECU, and the ECU calculates an own vehicle course as a course along which an own vehicle is expected to proceed during a first transfer prediction time, and time-dependent own vehicle positions on the own vehicle course, and calculates an oncoming vehicle course as a course along which an oncoming vehicle is expected to proceed during a second transfer prediction time, and time-depending oncoming vehicle positions on the oncoming vehicle course. When it is determined that the own vehicle or oncoming vehicle is traveling on a curve, the ECU sets the first transfer prediction time and the second transfer prediction time such that at least one of the first transfer prediction time or the second transfer prediction time is set to a shorter time, as compared with the case where neither of the own vehicle and the oncoming vehicle is traveling on a curve, determines whether one of the own vehicle positions overlaps a corresponding one of the oncoming vehicle positions, and performs avoidance control according to the result of determination.

3 Claims, 8 Drawing Sheets

COLLISION AVOIDANCE CONTROL SYSTEM AND CONTROL METHOD

INCORPORATION BY REFERENCE

The disclosure of Japanese Patent Application No. 2015-008705 filed on Jan. 20, 2015 including the specification, drawings and abstract is incorporated herein by reference in its entirety.

BACKGROUND OF THE INVENTION

1. Field of the Invention

The invention relates to a collision avoidance control system that performs avoidance control for avoiding a collision between an oncoming vehicle and an own vehicle.

2. Description of Related Art

Japanese Patent Application Publication No. 2008-137396 (JP 2008-137396 A) is known as a technical literature relating to a collision avoidance control system that performs avoidance control for avoiding a collision between an oncoming vehicle and an own vehicle. When a system described in this publication determines an obstacle in front of the own vehicle as an oncoming vehicle, the system predicts a possibility of a collision of the own vehicle with the oncoming vehicle, based on a course of the own vehicle, a traveling direction of the oncoming vehicle, and the relative position and relative velocity vector of the oncoming vehicle relative to the own vehicle. In this system, a warning is given to an occupant of the own vehicle or a brake system is activated based on the prediction result of the collision possibility.

SUMMARY OF THE INVENTION

In the meantime, when at least one of the own vehicle or the oncoming vehicle is traveling on a curve, a situation where the traveling direction or course of the oncoming vehicle intersects with the course of the own vehicle takes place frequently. However, in the known system as described above, traveling conditions (such as straight traveling, and curve traveling) of the own vehicle and the oncoming vehicle are not taken into consideration when the collision possibility is predicted; therefore, avoidance control, such as warning, may be performed in unnecessary scenes.

Thus, the present invention provides a collision avoidance control system that is able to curb unnecessary avoidance control involving an oncoming vehicle.

According to one aspect of the invention, a collision avoidance control system includes an ECU. The ECU is configured to: detect an oncoming vehicle; perform avoidance control, the avoidance control being control for avoiding a collision between the oncoming vehicle and an own vehicle; determine whether the own vehicle is traveling on a curve; determine whether the oncoming vehicle is traveling on a curve, based on a result of the detection; setting a first transfer prediction time and a second transfer prediction time, such that at least one of the first transfer prediction time or the second transfer prediction time is set to a shorter time when it is determined that the own vehicle is traveling on a curve, or when it is determined that the oncoming vehicle is traveling on a curve, as compared with the time when neither of the own vehicle and the oncoming vehicle is traveling on a curve; calculate an own vehicle course and time-dependent own vehicle positions on the own vehicle course, based on a traveling direction of the own vehicle and a vehicle speed of the own vehicle, the own vehicle course being a course along which the own vehicle is expected to proceed during the first transfer prediction time; calculate an oncoming vehicle course and time-depending oncoming vehicle positions on the oncoming vehicle course, based on the result of the detection, the oncoming vehicle course being a course along which the oncoming vehicle is expected to proceed during the second transfer prediction time; determine whether there is a point in time at which one of the own vehicle positions on the own vehicle course overlaps a corresponding one of the oncoming vehicle positions on the oncoming vehicle course; and perform the avoidance control when it is determined that there is a point in time at which one of the own vehicle positions overlaps a corresponding one of the oncoming vehicle positions.

When it is determined that the own vehicle or the oncoming vehicle is traveling on a curve, the collision avoidance system according to the above aspect of the invention sets at least one of the first transfer prediction time or the second transfer prediction time to the shorter time, as compared with the time when it is determined that neither of the own vehicle and the oncoming vehicle is traveling on a curve. Accordingly, with the collision avoidance control system, at least one of the calculated own vehicle course or oncoming vehicle course is shortened when the own vehicle or the oncoming vehicle is traveling on a curve; therefore, it is less likely to be determined that one of the own vehicle positions on the own vehicle course overlaps a corresponding one of the oncoming vehicle positions on the oncoming vehicle course, as compared with the time when the own vehicle course and the oncoming vehicle course are not shortened, and unnecessary avoidance control involving the oncoming vehicle can be curbed.

In the collision avoidance control system according to the above aspect of the invention, when it is determined that the own vehicle is traveling on a curve, the ECU may set the first transfer prediction time to the shorter time, as compared with the time when it is determined that the own vehicle is not traveling on a curve. When it is determined that the oncoming vehicle is traveling on a curve, the ECU may set the second transfer prediction time to the shorter time, as compared with the time when it is determined that the oncoming vehicle is not traveling on a curve.

With the above arrangement, the transfer prediction time of one of the own vehicle and the oncoming vehicle which is traveling on a curve is set to the shorter time, so that an appropriate collision determination can be made with respect to the vehicle that is not traveling on a curve, and unnecessary avoidance control concerning curve traveling can be curbed.

In the collision avoidance control system according to above aspect of the invention, the ECU may determine whether a deceleration of the own vehicle is equal to or larger than a first deceleration threshold value, and determine whether a deceleration of the oncoming vehicle is equal to or larger than a second deceleration threshold value, based on a the result of the detection. When it is determined that the deceleration of the own vehicle is equal to or larger than the first deceleration threshold value, or when it is determined that the deceleration of the oncoming vehicle is equal to or larger than the second deceleration threshold value, each of the first transfer prediction time and the second transfer predicted time may be set to a preset time, irrespective of a result of determination as to whether the own vehicle is traveling on a curve, and a result of determination as to whether the oncoming vehicle is traveling on a curve.

When the own vehicle or the oncoming vehicle is being rapidly decelerated, it is not desirable to reduce chances of avoidance control by setting the first transfer prediction time or the second transfer prediction time to the shorter time. Thus, each of the first transfer prediction time and the second transfer prediction time is set to a preset length of time, so that appropriate chances of avoidance control can be ensured.

In the above aspect of the invention, the ECU may perform the avoidance control of the own vehicle.

Another aspect of the invention is concerned with a control method of a collision avoidance control system. The collision avoidance control system includes an ECU. The control method includes: detecting an oncoming vehicle by the ECU; setting a first transfer prediction time and a second transfer prediction time, such that at least one of the first transfer prediction time or the second transfer prediction time is set to a shorter time when a first condition and a second condition are satisfied, as compared with the time when the first condition is not satisfied or the second condition is not satisfied, the first condition being that a deceleration of the own vehicle is smaller than a first deceleration threshold value, and a deceleration of the oncoming vehicle is smaller than a second deceleration threshold value, the second condition being that the own vehicle is traveling on a curve, or the oncoming vehicle is traveling on a curve; calculating an own vehicle course and an oncoming vehicle course by the ECU, the own vehicle course being a course along which the own vehicle is expected to proceed during the first transfer prediction time, the oncoming vehicle course being a course along which the oncoming vehicle is expected to proceed during the second transfer prediction time; and performing avoidance control of the own vehicle by the ECU when there is a point in time at which one of the own vehicle positions overlaps a corresponding one of the oncoming vehicle positions, the avoidance control being control for avoiding a collision between the oncoming vehicle and the own vehicle.

According to the above aspect of the invention, the collision avoidance control system that can curb unnecessary avoidance control involving the oncoming vehicle is provided.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

A preferred embodiment of the invention will be described in detail with reference to the drawings.

Figure 1:
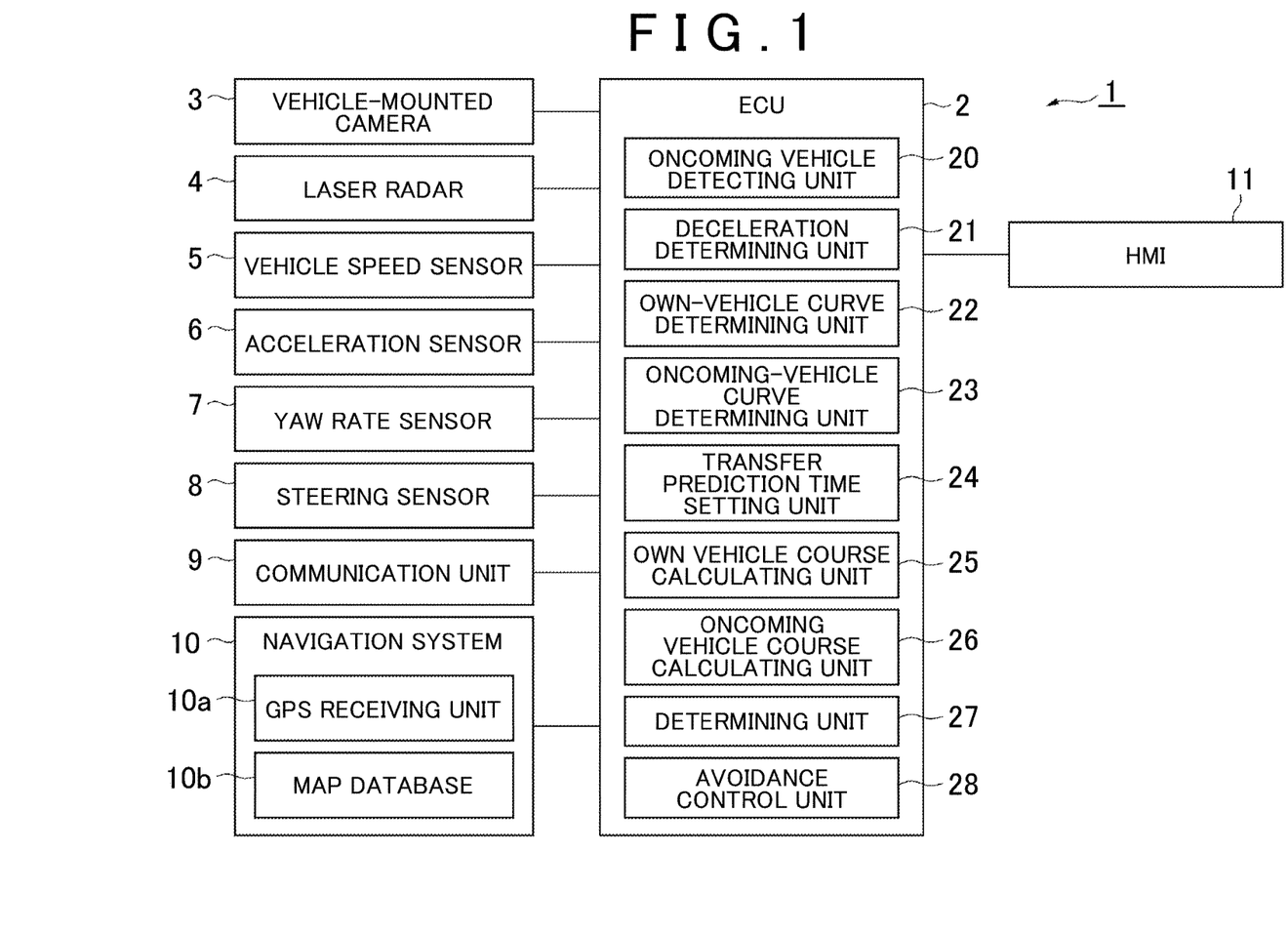
FIG. 1 is a block diagram showing a collision avoidance control system according to one embodiment of the invention.

FIG. 1 is a block diagram showing a collision avoidance control system according to the embodiment. The collision avoidance control system 1 shown in FIG. 1 performs avoidance control for avoiding a collision between an own vehicle and an oncoming vehicle. The collision avoidance control system 1 is installed on a vehicle, such as a passenger car, for example. The vehicle may be an autonomous vehicle, or may be a vehicle that permits only manual driving. Here, the oncoming vehicle is another vehicle (including a two-wheel vehicle, as well as a four-wheel vehicle) that travels in a direction opposite to a traveling direction of the own vehicle, on a road on which the own vehicle travels. For example, the oncoming vehicle travels on an opposing traffic lane of the road. The avoidance control is control for avoiding a collision between the own vehicle and the oncoming vehicle. One example of the avoidance control is a warning given to the driver. Also, the avoidance control may be steering control or speed reduction control of the own vehicle for avoiding a collision with the oncoming vehicle.

The collision avoidance control system 1 detects an oncoming vehicle, based on an image captured by a vehicle-mounted camera, or a detection result of a laser radar, for example. For example, the collision avoidance control system 1 detects another vehicle approaching the own vehicle from the front thereof, as the oncoming vehicle, based on the image captured by the vehicle-mounted camera, or the detection result of the laser radar.

When the collision avoidance control system 1 detects an oncoming vehicle, it determines whether the own vehicle is traveling on a curve, and also determines whether the oncoming vehicle is traveling on the curve. The curve means a section of a road which has a radius of curvature that is equal to or larger than a preset threshold value. The collision avoidance control system 1 determines whether the own vehicle is traveling on a curve, based on driver's steering information of the own vehicle, for example. The collision avoidance control system 1 may determine whether the own vehicle and the oncoming vehicle are traveling on a curve, from the radius of curvature of the road obtained through white-line recognition, based on an image captured by the vehicle-mounted camera. The collision avoidance control system 1 may determine whether the oncoming vehicle is traveling on a curve, from changes in the direction of a velocity vector (vector that extends in the traveling direction of the oncoming vehicle) of the oncoming vehicle, based on the detection result of the laser radar. The manner of determining whether the own vehicle or the oncoming vehicle is traveling on a curve will be described in greater detail later.

Figure 2:
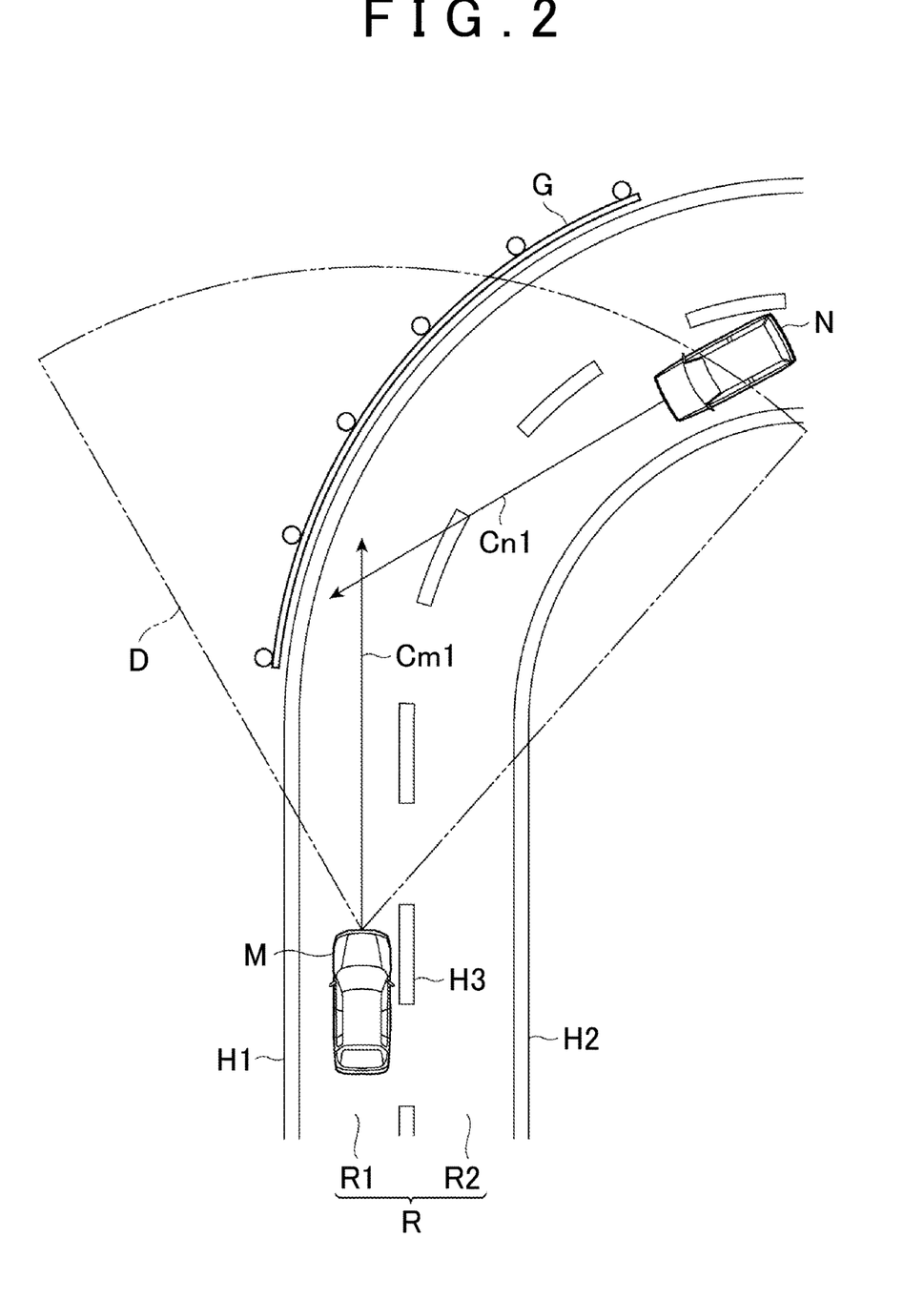
FIG. 2 is a plan view showing an own vehicle course of an own vehicle that is going to enter a curve, and an oncoming vehicle course of an oncoming vehicle that is traveling on a curve.

FIG. 2 is a plan view showing an own vehicle course of the own vehicle that is going to enter a curve, and an oncoming vehicle course of the oncoming vehicle that is traveling on the curve. FIG. 2 shows a road R having one lane on each side, traffic lane R1, opposing traffic lane R2, white line H1 (a boundary of a vehicle traffic zone on the traffic lane R1 side), white line H2 (a boundary of the vehicle traffic zone on the opposing traffic lane R2 side), white line H3 (center line), guardrail G, own vehicle M, oncoming vehicle N, own vehicle course Cm1, oncoming vehicle course Cn1, and a range D of an image captured by a vehicle-mounted camera. In FIG. 2, the own vehicle M and the oncoming vehicle N travel at the same vehicle speed.

In a situation as shown in FIG. 2, the collision avoidance control system 1 detects the oncoming vehicle N, based on the image captured by the vehicle-mounted camera, for example. Then, on the basis of the image captured by the vehicle-mounted camera, the collision avoidance control system 1 determines that the own vehicle M is not traveling on the curve (i.e., is traveling on a straight line), from the radius of curvature of the road obtained by recognizing the white lines H1-H3 included in the range D of the image captured by the vehicle-mounted camera. Meanwhile, the collision avoidance control system 1 determines that the oncoming vehicle N is traveling on the curve, based on the detection result of the laser radar, for example.

The collision avoidance control system 1 calculates the own vehicle course and the oncoming vehicle course used for collision determination, based on the result of determination as to whether the own vehicle M and the oncoming vehicle N are traveling on a curve. The own vehicle course is a course along which the own vehicle M is expected to travel during a first transfer prediction time. The oncoming vehicle course is a course along which the oncoming vehicle N is expected to travel during a second transfer prediction time. The collision avoidance control system 1 sets the first transfer prediction time and the second transfer prediction time, prior to calculation of the own vehicle course and oncoming vehicle course used for collision determination.

The collision avoidance control system 1 sets the first transfer prediction time and the second transfer prediction time, based on the result of determination as to whether the own vehicle M and the oncoming vehicle N are traveling on a curve. When the collision avoidance control system 1 determines that the own vehicle M or the oncoming vehicle N is traveling on a curve, the system 1 sets at least one of the first transfer prediction time or the second transfer prediction time to a shorter length of time, as compared with the case where neither of the own vehicle M and the oncoming vehicle N is traveling on a curve.

More specifically, when the collision avoidance control system 1 determines that neither of the own vehicle M and the oncoming vehicle N is not traveling on a curve, the system 1 sets the first transfer prediction time and the second transfer prediction time to a preset normal time. The normal time is a standard length of time that is appropriately selected in connection with calculation of a course used for collision determination. The normal time may be set to a length of time that is equal to or longer than 3.5 seconds and equal to or shorter than 5 seconds, for example. The normal time set for the first transfer prediction time may be different from the normal time set for the second transfer prediction time.

When the collision avoidance control system 1 determines that the own vehicle M or the oncoming vehicle N is traveling on a curve, the system 1 sets at least one of the first transfer prediction time or the second transfer prediction time to the shorter time than the normal time. The shorter time may be set to a length of time that is equal to or longer than 1.5 seconds and equal to or shorter than 3 seconds, for example. The first transfer prediction time and the second transfer prediction time are not necessarily set to the same length of time, but may be different lengths of time In FIG. 2 and FIG. 3 that will be described later, both of the first transfer prediction time and the second transfer prediction time are set to the normal time, for the sake of explanation of the case where a collision is determined.

The collision avoidance control system 1 calculates the own vehicle course Cm1 as a course along which the own vehicle M is expected to travel during the first transfer prediction time, based on the traveling direction of the own vehicle M and the vehicle speed of the own vehicle M. The length of the own vehicle course Cm1 is longer as the first transfer prediction time is longer, and the length of the own vehicle course Cm1 is shorter as the first transfer prediction time is shorter. The length of the own vehicle course Cm1 is longer as the vehicle speed of the own vehicle M is faster.

The collision avoidance control system 1 also calculates time-dependent own vehicle positions on the own vehicle course Cm1, based on the vehicle speed of the own vehicle M. The time-dependent own vehicle positions on the own vehicle course Cm1 are predicted positions of the own vehicle M to be reached at intervals of a preset time (e.g., 1 second) on the own vehicle course Cm1, for example.

The collision avoidance control system 1 calculates the oncoming vehicle course Cn1 as a course along which the oncoming vehicle N is expected to travel during the second transfer prediction time, based on the detection result of the laser radar, for example. The length of the oncoming vehicle course Cn1 is longer as the second transfer prediction time is longer, and the length of the oncoming vehicle course Cn1 is shorter as the second transfer prediction time is shorter. The length of the oncoming vehicle course Cn1 is longer as the vehicle speed of the oncoming vehicle N is faster.

The collision avoidance control system 1 calculates the oncoming vehicle course Cn1 from the relative position and relative velocity of the oncoming vehicle N relative to the own vehicle M, based on the detection result of the laser radar, for example. The collision avoidance control system 1 also calculates time-dependent oncoming vehicle positions on the oncoming vehicle course Cn1, based on the relative velocity of the oncoming vehicle N relative to the own vehicle M, for example. The time-dependent oncoming vehicle positions on the oncoming vehicle course Cn1 are predicted positions of the oncoming vehicle N to be reached at intervals of a preset time (e.g., 1 second) on the oncoming vehicle course Cn1, for example.

The collision avoidance control system 1 determines whether there is any point in time at which one of the time-dependent own vehicle positions on the own vehicle course Cm1 overlaps a corresponding one of the time-dependent oncoming vehicle positions on the oncoming vehicle course Cn1, as a determination on a collision between the own vehicle M and the oncoming vehicle N.

Figure 3:
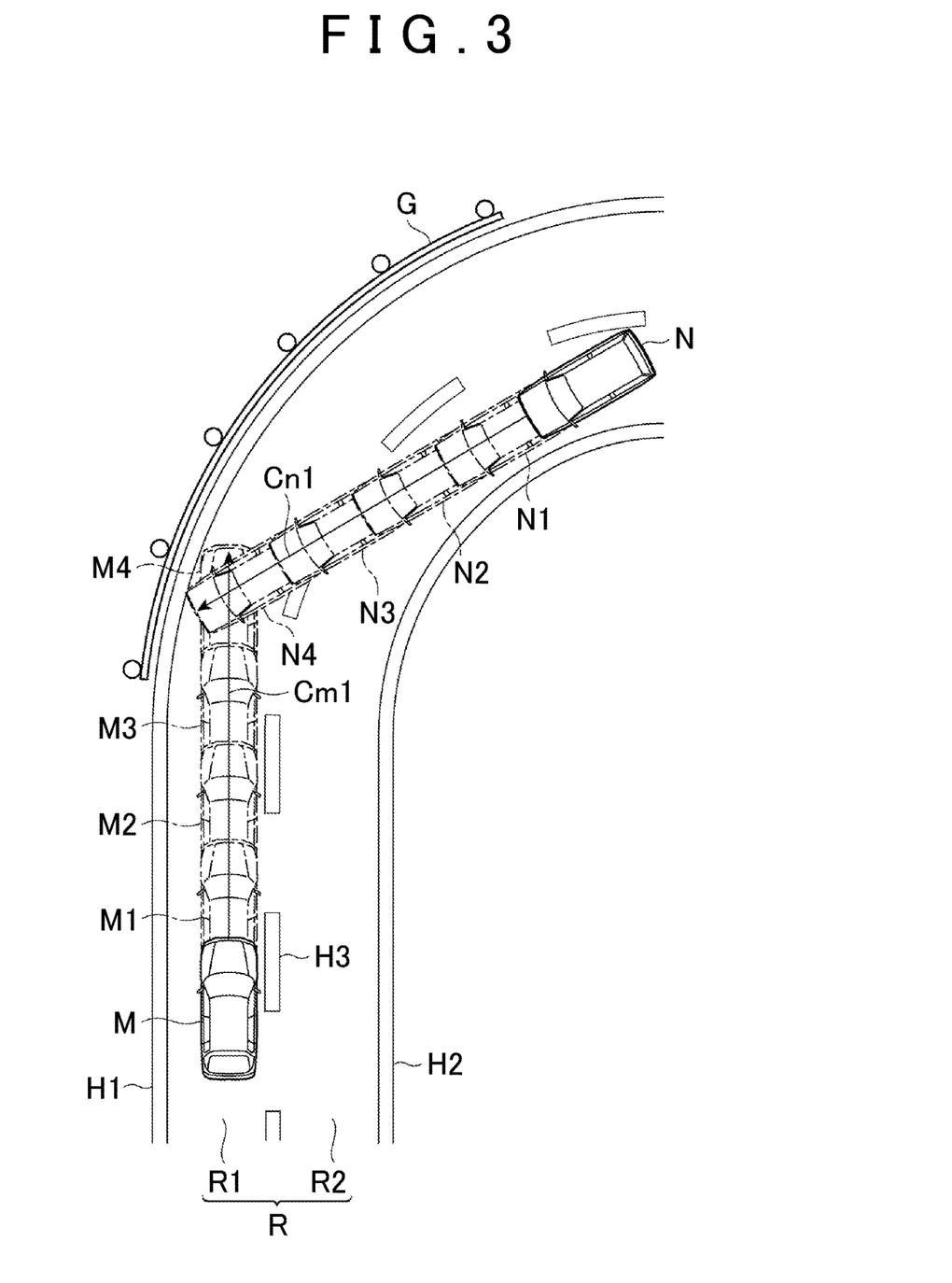
FIG. 3 is a plan view useful for explaining determination of a collision between the own vehicle that is going to enter the curve and the oncoming vehicle that is traveling on the curve.

FIG. 3 is a plan view useful for explaining determination of a collision between the own vehicle M that is going to enter a curve, and the oncoming vehicle N that is traveling on the curve. FIG. 3 shows own vehicle positions M1-M4 as predicted positions of the own vehicle M to be reached at intervals of a preset time on the own vehicle course Cm1, and oncoming vehicle positions N1-N4 as predicted positions of the oncoming vehicle N to be reached at intervals of a preset time on the oncoming vehicle course Cn1. The own vehicle position M1 and the oncoming vehicle position N1 are positions at which the own vehicle M and the oncoming vehicle N are expected to be located one second after they are located at the current positions, for example. The own vehicle position M2 and the oncoming vehicle position N2 are positions at which the own vehicle M and the oncoming vehicle N are expected to be located two seconds after they are located at the current positions, for example. The own vehicle position M3 and the oncoming vehicle position N3 are positions at which the own vehicle M and the oncoming vehicle N are expected to be located three seconds after they are located at the current positions, for example. The own vehicle position M4 and the oncoming vehicle position N4 are positions at which the own vehicle M and the oncoming vehicle N are expected to be located four seconds after they are located at the current positions, for example.

As shown in FIG. 3, the own vehicle position M4 on the own vehicle course Cm1 overlaps the oncoming vehicle position N4 on the oncoming vehicle course Cn1. In this case, the collision avoidance control system 1 determines that there is a point in time at which the own vehicle position M4 on the own vehicle course Cm1 overlaps the oncoming vehicle position N4 on the oncoming vehicle course Cn1. When the collision avoidance control system 1 determines that there is a point in time at which the own vehicle position M4 on the own vehicle course Cm1 overlaps the oncoming vehicle position N4 on the oncoming vehicle course Cn1, the system 1 performs avoidance control for avoiding a collision between the oncoming vehicle N and the own vehicle M.

However, in the situation shown in FIG. 3, the oncoming vehicle N normally travels while going round the curve along the opposing traffic lane R2, and passes the own vehicle M traveling on the traffic lane R1 without colliding with the own vehicle M. Since there are a great number of scenes in which the own vehicle M and the oncoming vehicle N pass each other on a curve, the driver may feel strange or uncomfortable if the system performs avoidance control each time the oncoming vehicle N appears during traveling on a curve or in the vicinity of a curve.

Thus, when the collision avoidance control system 1 according to this embodiment determines that the own vehicle M or the oncoming vehicle N is traveling on a curve, the system 1 sets at least one of the first transfer prediction time or the second transfer prediction time to the shorter time, as compared with the case where neither of the own vehicle M and the oncoming vehicle N is traveling on a curve, so as to curb unnecessary avoidance control associated with the oncoming vehicle N. In the following, some cases will be specifically described with reference to the drawings.

Figure 4A:
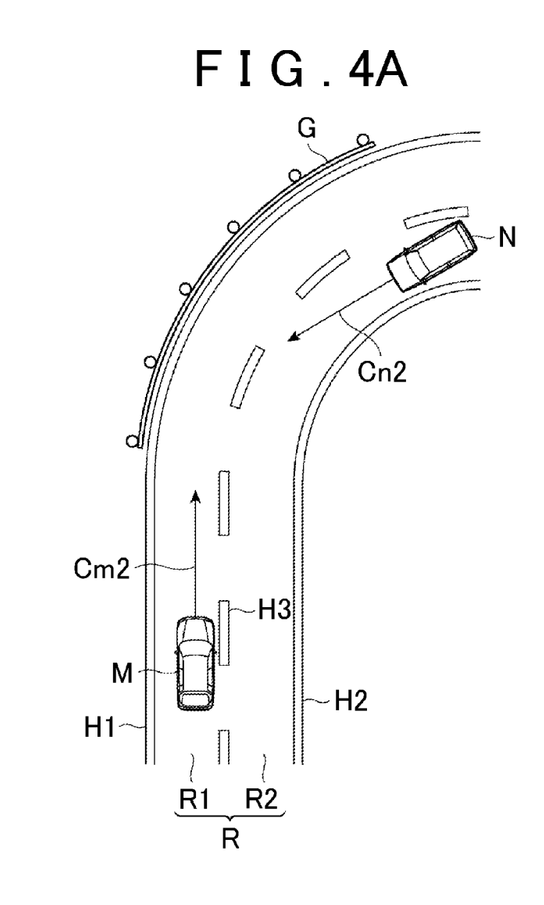
FIG. 4A is a plan view showing the case where both of a first transfer prediction time of the own vehicle and a second transfer prediction time of the oncoming vehicle are set to a shorter length of time, in the situation shown in FIG. 2.

FIG. 4A is a plan view showing the case where both of the first transfer prediction time of the own vehicle M and the second transfer prediction time of the oncoming vehicle N are set to the shorter time, in the situation shown in FIG. 2. As shown in FIG. 4A, when the collision avoidance control system 1 determines that the oncoming vehicle N is traveling on a curve, the system 1 may set both of the first transfer prediction time of the own vehicle M and the second transfer prediction time of the oncoming vehicle N to the shorter time. The collision avoidance control system 1 calculates the own vehicle course Cm2 and the oncoming vehicle course Cn2, using the first transfer prediction time and second transfer prediction time thus set to the shorter time. The own vehicle course Cm2 has a shorter length than the own vehicle course Cm1 shown in FIG. 2. The oncoming vehicle course Cn2 has a shorter length than the oncoming vehicle course Cn1 shown in FIG. 2. In the situation shown in FIG. 4A, the collision avoidance control system 1 determines that there is no point in time at which one of the time-dependent own vehicle positions on the own vehicle course Cm2 overlaps a corresponding one of the time-dependent oncoming vehicle positions on the oncoming vehicle course Cn2, and does not perform avoidance control.

Figure 4B:
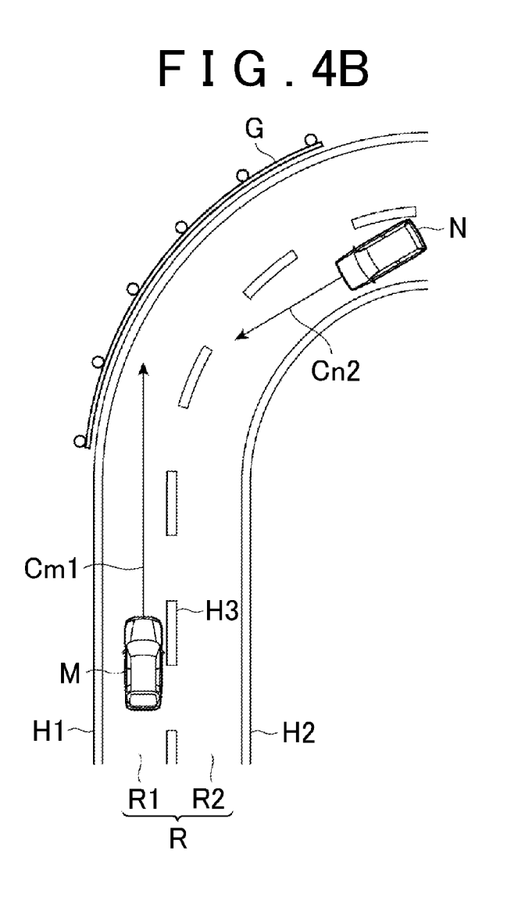
FIG. 4B is a plan view showing the case where the second transfer prediction time of the oncoming vehicle is set to the shorter time, in the situation shown in FIG. 2.

FIG. 4B is a plan view showing the case where the second transfer prediction time of the oncoming vehicle N is set to the shorter time in the situation as shown in FIG. 2. As shown in FIG. 4B, when the collision avoidance control system 1 determines that the oncoming vehicle N is traveling on a curve, the system 1 may set the second transfer prediction time of the oncoming vehicle N to the shorter time. In this case, the first transfer prediction time of the own vehicle M is set to the normal time. The collision avoidance control system 1 calculates the own vehicle course Cm1, using the first transfer prediction time set to the normal time, and calculates the oncoming vehicle course Cn2, using the second transfer prediction time set to the shorter time. In the situation shown in FIG. 4B, the collision avoidance control system 1 determines that there is no point in time at which one of the time-dependent own vehicle positions on the own vehicle course Cm1 overlaps a corresponding one of the time-dependent oncoming vehicle positions on the oncoming vehicle course Cn2, and does not perform avoidance control.

Figure 5:
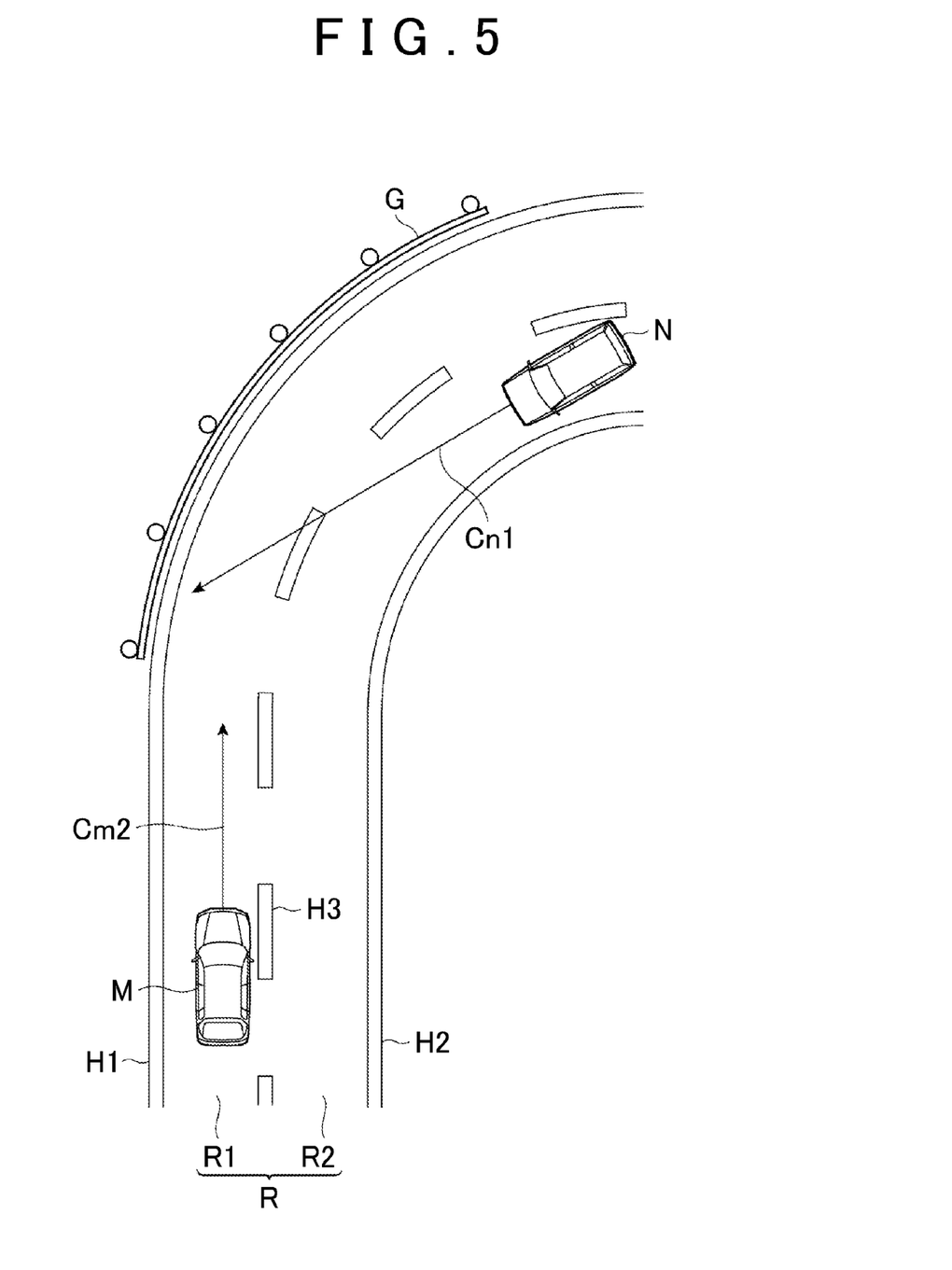
FIG. 5 is a plan view showing a situation where the first transfer prediction time of the own vehicle is set to the shorter time, in the situation shown in FIG. 2.

FIG. 5 is a plan view showing the case where the first transfer prediction time of the own vehicle M is set to the shorter time in the situation as shown in FIG. 2. As shown in FIG. 5, when the collision avoidance control system 1 determines that the oncoming vehicle N is traveling on a curve, the system 1 may set the first transfer prediction time of the own vehicle M to the shorter time. In this case, the second transfer prediction time of the oncoming vehicle N remains the normal time. The collision avoidance control system 1 calculates the own vehicle course Cm2, using the first transfer prediction time set to the shorter time, and calculates the oncoming vehicle course Cn1, using the second transfer prediction time set to the normal time. In the situation shown in FIG. 5, the collision avoidance control system 1 determines that there is no point in time at which one of the time-dependent own vehicle positions on the own vehicle course Cm2 overlaps a corresponding one of the time-dependent oncoming vehicle positions on the oncoming vehicle course Cn1, and does not perform avoidance control.

Figure 6A:
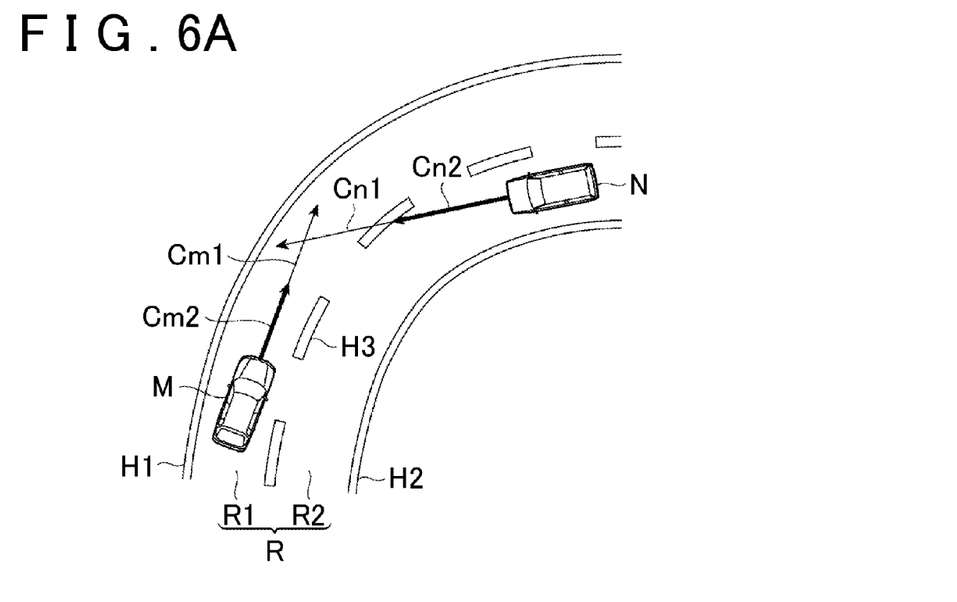
FIG. 6A is a plan view showing a situation where both of the own vehicle and the oncoming vehicle are traveling on a curve.

FIG. 6A is a plan view showing a situation where both of the own vehicle and the oncoming vehicle are traveling on a curve. When both of the own vehicle M and the oncoming vehicle N are traveling on the curve, as shown in FIG. 6A, the collision avoidance control system 1 may set both of the first transfer prediction time of the own vehicle M and the second transfer prediction time of the oncoming vehicle N to the shorter time. The collision avoidance control system 1 may set only one of the first transfer prediction time of the own vehicle M and the second transfer prediction time of the oncoming vehicle N to the shorter time, even when both of the own vehicle M and the oncoming vehicle N are traveling on the curve.

Figure 6B:
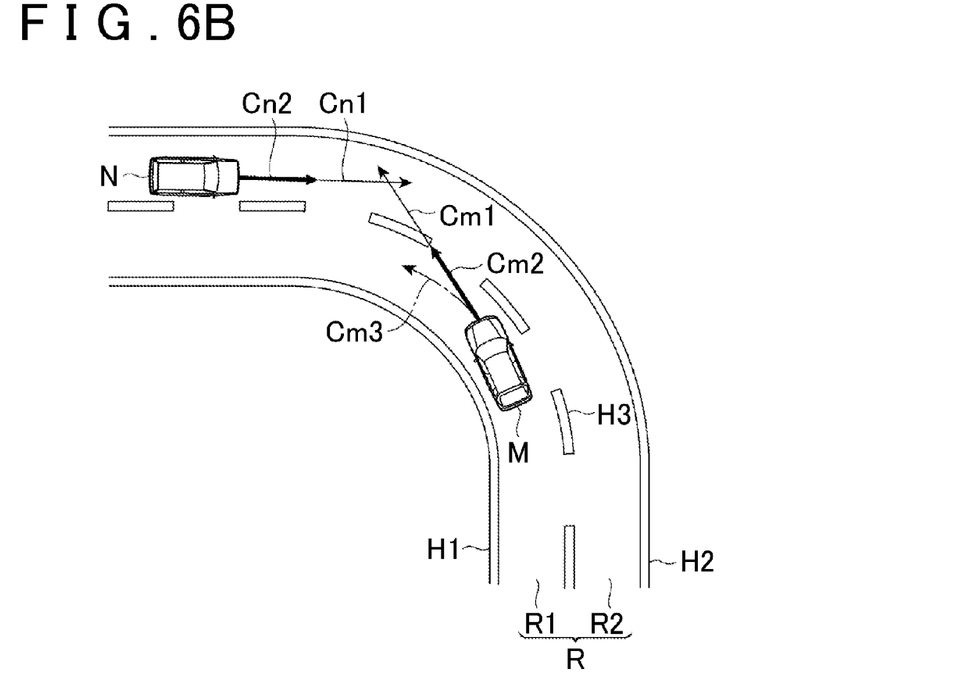
FIG. 6B is a plan view showing a situation where the own vehicle is traveling on a curve and the oncoming vehicle is going to enter the curve.

FIG. 6B is a plan view showing a situation where the own vehicle is traveling on a curve, and the oncoming vehicle is going to enter the curve. When the own vehicle M is traveling on a curve, and the oncoming vehicle N is not traveling on the curve (but traveling straight), as shown in FIG. 6B, the collision avoidance control system 1 may set both of the first transfer prediction time of the own vehicle M and the second transfer prediction time of the oncoming vehicle N to the shorter time. Alternatively, when the own vehicle M is traveling on a curve, and the oncoming vehicle N is not traveling on the curve, the collision avoidance control system 1 may set only one of the first transfer prediction time of the own vehicle M and the second transfer prediction time of the oncoming vehicle N to the shorter time.

In the situations shown in FIG. 6A and FIG. 6B as described above, too, the collision avoidance control system 1 determines that there is no point in time at which corresponding ones of the time-dependent own vehicle positions and time-dependent oncoming vehicle positions on the respective courses overlap each other, and does not perform avoidance control. Accordingly, even when the own vehicle M or the oncoming vehicle N is traveling on a curve, the collision avoidance control system 1 is less likely or unlikely to perform unnecessary avoidance control associated with the oncoming vehicle N, as compared with the time when both of the first transfer prediction time of the own vehicle M and the second transfer prediction time of the oncoming vehicle N are set to the normal time (when the own vehicle course Cm1 and the oncoming vehicle course Cn1 are used).

Also, as shown in FIG. 6B, the collision avoidance control system 1 may calculate an own vehicle course Cm3 that is curved based on the steering angle of the own vehicle M. In this case, the collision avoidance control system 1 can reduce the possibility of erroneous determination regarding a collision between the own vehicle M and the oncoming vehicle N, as compared with the case where the own vehicle course Cm2 that is not curved based on the steering angle of the own vehicle M is employed.

The collision avoidance control system 1 may set the transfer prediction time of one or both of the own vehicle M and the oncoming vehicle N which is/are determined as being traveling on a curve, to the shorter time. More specifically, when the collision avoidance control system 1 determines that only the own vehicle M is traveling on a curve, the system 1 sets the first transfer prediction time to the shorter time, and sets the second transfer prediction time to the normal time. When the collision avoidance control system 1 determines that only the oncoming vehicle N is traveling on a curve, the system 1 sets the first transfer prediction time to the normal time, and sets the second transfer prediction time to the shorter time. When the collision avoidance control system 1 determines that both of the own vehicle M and the oncoming vehicle N are traveling on a curve, the system 1 sets both of the first transfer prediction time and the second transfer prediction time to the shorter time.

In the following, the configuration of the collision avoidance control system 1 according to this embodiment will be described. The collision avoidance control system 1 shown in FIG. 1 includes an ECU (Electronic Control Unit) 2, vehicle-mounted camera 3, laser radar 4, vehicle speed sensor 5, acceleration sensor 6, yaw rate sensor 7, steering sensor 8, communication unit 9, navigation system 10, and HMI (Human Machine Interface) 11.

The ECU 2 performs avoidance control for avoiding a collision between the own vehicle M and the oncoming vehicle N. The ECU 2 is an electronic control unit having CPU (Central Processing Unit), ROM (Read Only Memory), RAM (Random Access Memory), and so forth. The ECU 2 performs various controls, by loading programs stored in the ROM into the RAM, and causing the CPU to execute the programs. The ECU 2 may consist of two or more electronic control units.

The vehicle-mounted camera 3 is provided on the rear side of a front windshield of the own vehicle M, for example, and captures an image of the front of the own vehicle M. The vehicle-mounted camera 3 transmits the captured image of the front of the own vehicle M to the ECU 2. The vehicle-mounted camera 3 may be a monocular camera, or a stereo camera. The stereo camera has two image pickup units that are located so as to reproduce a binocular disparity. The captured image (disparity image) of the stereo camera includes depth-direction information. The vehicle-mounted camera 3 may include two or more cameras that capture images of the surroundings of the own vehicle M.

The laser radar 4 detects an obstacle outside the own vehicle M, using radio waves (such as millimeter waves). The laser radar 4 transmits radio waves to the surroundings of the own vehicle M, and receives the radio waves reflected by an obstacle, to thus detect the obstacle. The laser radar 4 transmits the detected obstacle information to the ECU 2. A millimeter-wave radar or a LIDAR may be used in place of the laser radar 4. The LIDAR detects an obstacle outside the own vehicle M, using light.

The vehicle speed sensor 5 is a detector for detecting the speed of the own vehicle M. As the vehicle speed sensor 5, a wheel speed sensor may be used which is provided on a wheel of the own vehicle M or a driveshaft, or the like, that rotates as a unit with the wheel, for detecting the rotational speed of the wheel. The vehicle speed sensor 5 transmits the detected vehicle speed information (wheel speed information) to the ECU 2.

The acceleration sensor 6 is a detector for detecting the acceleration of the own vehicle M. The acceleration sensor 6 includes a longitudinal acceleration sensor that detects the acceleration in the longitudinal direction of the own vehicle M, and a lateral acceleration sensor that detects the lateral acceleration of the own vehicle M, for example. The acceleration sensor 6 transmits the acceleration information of the own vehicle M to the ECU 2, for example.

The yaw rate sensor 7 is a detector for detecting the yaw rate (rotation angular velocity) about the vertical axis passing the gravity center of the own vehicle M. As the yaw rate sensor 7, a gyro sensor, for example, may be used. The yaw rate sensor 7 transmits the detected yaw rate information of the own vehicle M to the ECU 2.

The steering sensor 8 is provided on a steering shaft of the own vehicle, for example, and detects steering torque applied by the driver to the steering wheel and the steering angle. The steering sensor 8 transmits steering information concerning the detected steering torque and steering angle, to the ECU 2.

The communication unit 9 is installed on the own vehicle M, and performs inter-vehicle communications with other vehicles around the own vehicle M. For example, the communication unit 9 obtains information of other vehicles (a preceding vehicle, an oncoming vehicle, etc.) around the own vehicle via inter-vehicle communications. The communication unit 9 may obtain information on a road on which the own vehicle travels, via road-vehicle communications with a road-side transmitter/receiver (e.g., optical beacon) provided on the road.

The navigation system 10 guides the driver of the own vehicle M to a preset destination. The navigation system 10 has a GPS receiving unit 10a for measuring the position of the own vehicle M, and a map database 10b in which map information is stored, for example. The GPS receiving unit 10a receives signals from three or more GPS satellites, for example, so as to measure the position of the own vehicle M (e.g., the longitude and latitude of the vehicle). The map information of the map database 10b includes, for example, location information of roads, road type information, road shape information (including a straight line and a curve that are discriminated from each other), location information of intersections or junctions, and so forth.

The HMI 11 is an interface for transmitting and receiving information between the driver and the system. The HMI 11 includes, for example, a display panel on which image information is displayed for the driver, etc., and operational buttons, touch panel, or the like, with which the driver can perform input operation. Also, the HMI 11 is connected to a loudspeaker of the own vehicle M. The HMI 11 displays image information according to a control signal from the ECU 2, on the display, and generates voice according to the control signal, from the loudspeaker.

The collision avoidance control system 1 does not necessarily include the laser radar 4 if it has another sensor or camera with which the oncoming vehicle N can be detected. Also, the collision avoidance control system 1 does not necessarily include the vehicle speed sensor 5, acceleration sensor 6, yaw rate sensor 7, steering sensor 8, and the communication unit 9. Also, the collision avoidance control system 1 may include a GPS receiving unit 10a and a map database 10b, in place of the navigation system 10. The collision avoidance control system 1 does not necessarily include the navigation system 10, GPS receiving unit 10a, and the map database 10b.

Further, the collision avoidance control system 1 does not necessarily include the HMI 11, but may be configured to be able to generate a warning as avoidance control by means of a display or a loudspeaker provided in the own vehicle M. Also, the collision avoidance control system 1 may be configured to perform steering control or speed reduction control of the own vehicle M as avoidance control. In this case, the collision avoidance control system 1 may be configured to carry out only the avoidance control in the form of the steering control or the speed reduction control, without giving a warning.

Next, the functional configuration of the ECU 2 will be described. The ECU 2 includes an oncoming vehicle detecting unit 20, deceleration determining unit 21, own-vehicle curve traveling determining unit 22, oncoming-vehicle curve traveling determining unit 23, transfer prediction time setting unit 24, own vehicle course calculating unit 25, oncoming vehicle course calculating unit 26, determining unit 27, and an avoidance control unit 28. A part of the functions of the ECU 2 may be performed by a computer of a facility, such as an information management center, capable of communicating with the own vehicle M via the communication unit 9.

The oncoming vehicle detecting unit 20 detects the oncoming vehicle N that travels in a direction opposite to that of the own vehicle M, based on an image captured by the vehicle-mounted camera 3 or obstacle information of the laser radar 4, for example. The oncoming vehicle detecting unit 20 detects an oncoming vehicle through known image processing, based on the image captured by the vehicle-mounted camera, for example. The oncoming vehicle detecting unit 20 may recognize white lines (such as a center line and a boundary of a vehicle traffic zone) that define the opposing traffic lane R2, based on the image captured by the vehicle-mounted camera for capturing the image around the own vehicle M, and detect another vehicle on the opposing traffic lane R2 as the oncoming vehicle N. The oncoming vehicle detecting unit 20 may detect another vehicle approaching the own vehicle M from around the own vehicle M as the oncoming vehicle N, based on the detection result of the laser radar. The oncoming vehicle detecting unit 20 may detect an oncoming vehicle, based on both of the image captured by the vehicle-mounted camera 3 and the obstacle information of the laser radar 4. The oncoming vehicle detecting unit 20 may detect an oncoming vehicle N, based on the position and traveling direction of another vehicle obtained by the communication unit 9 via inter-vehicle communications with the other vehicle. The oncoming vehicle detecting unit 20 may also detect an oncoming vehicle by known methods.

The deceleration determining unit 21 determines whether the deceleration of the own vehicle M is equal to or larger than a first deceleration threshold value, based on acceleration information of the acceleration sensor 6, for example. The first deceleration threshold value is a threshold value used for determining whether the own vehicle M is being rapidly decelerated. The first deceleration threshold value may be a fixed value, or may vary according to the vehicle speed, for example.

The deceleration determining unit 21 also determines whether the deceleration of the oncoming vehicle N is equal to or larger than a second deceleration threshold value, based on obstacle information of the laser radar 4, for example. The second deceleration threshold value is a threshold value used for determining whether the oncoming vehicle N is being rapidly decelerated. The second deceleration threshold value may be a fixed value, or may vary according to the vehicle speed, for example. The deceleration determining unit 21 may determine whether the deceleration of the oncoming vehicle N is equal to or larger than the second deceleration threshold value, based on the deceleration of the oncoming vehicle N obtained by the communication unit 9 via inter-vehicle communications with other vehicles. The collision avoidance control system 1 does not necessarily have the deceleration determining unit 21.

The own-vehicle curve traveling determining unit 22 determines whether the own vehicle M is traveling on a curve, based on steering information of the steering sensor 8, for example. The own-vehicle curve traveling determining unit 22 determines that the own vehicle M is traveling on a curve, when the steering angle of the steering wheel operated by the driver of the own vehicle M becomes equal to or larger than a threshold value, based on the steering information of the steering sensor 8, for example. The own-vehicle curve traveling determining unit 22 may determine that the own vehicle M is traveling on a curve, using information concerning turn-signal lamps of the own vehicle M, as well as the steering information of the steering sensor 8, when the steering angle becomes equal to or larger than the threshold value in a condition where no turn-signal lamp is turned on.

The own-vehicle curve traveling determining unit 22 may also determine whether the own vehicle M is traveling on a curve, through recognition of white lines around the own vehicle M, based on an image captured by the vehicle-mounted camera 3 (see FIG. 2). When the own-vehicle curve traveling determining unit 22 can recognize a guardrail or a wall provided along the road on which the own vehicle M travels, based on the image captured by the vehicle-mounted camera 3 or obstacle information of the laser radar 4, it may determine whether the own vehicle is traveling on a curve, from the radius of curvature (when viewed from above) of the guardrail or wall. The collision avoidance control system 1 may determine whether the own vehicle is traveling on a curve, based on information on the position of the own vehicle and map information. In addition, the own-vehicle curve traveling determining unit 22 may also determine whether the own vehicle M is traveling on a curve by known methods.

The oncoming-vehicle curve traveling determining unit 23 determines whether the oncoming vehicle N is traveling on a curve, based on the detection result of the oncoming vehicle detecting unit 20. The oncoming-vehicle curve traveling determining unit 23 determines whether the oncoming vehicle N detected by the oncoming vehicle detecting unit 20 is traveling on a curve, based on obstacle information of the laser radar 4, for example. More specifically, the oncoming-vehicle curve traveling determining unit 23 recognizes a velocity vector of the oncoming vehicle N from a change in the position of the oncoming vehicle N with time. After the oncoming-vehicle curve traveling determining unit 23 recognizes the velocity vector of the oncoming vehicle N a plurality of times, it determines whether the oncoming vehicle is traveling on a curve, based on the amount of change in the direction of the velocity vector (the amount of change in the traveling direction of the oncoming vehicle).

The oncoming-vehicle curve traveling determining unit 23 may also determine that the oncoming vehicle N located in front of the own vehicle M is traveling on a curve, by recognizing the curve in front of the own vehicle M from the radius of curvature of the road R obtained through recognition of the white lines, based on the image captured by the vehicle-mounted camera 3. Similarly, when the oncoming-vehicle curve traveling determining unit 23 recognizes a guardrail G or a wall in front of the own vehicle M, based on the image captured by the vehicle-mounted camera 3, it may determine that the oncoming vehicle N is traveling on a curve, by recognizing the curve in front of the own vehicle M from the radius of curvature of the guardrail G or wall. The oncoming-vehicle curve traveling determining unit 23 may determine whether the oncoming vehicle N is traveling on a curve, based on both of the image captured by the vehicle-mounted camera 3 and obstacle information of the laser radar 4. In addition, the oncoming-vehicle curve traveling determining unit 23 may determine whether the oncoming vehicle N is traveling on a curve by known methods.

The transfer prediction time setting unit 24 sets the first transfer prediction time of the own vehicle M and the second transfer prediction time of the oncoming vehicle N, based on the results of determination of the own-vehicle curve traveling determining unit 22 and the oncoming-vehicle curve traveling determining unit 23. When the own-vehicle curve traveling determining unit 22 determines that the own vehicle M is traveling on a curve, or the oncoming-vehicle curve traveling determining unit 23 determines that the oncoming vehicle N is traveling on a curve, the transfer prediction time setting unit 24 sets at least one of the first transfer prediction time of the own vehicle M or the second transfer prediction time of the oncoming vehicle N to a shorter length of time, as compared with the case where neither of the own vehicle M and the oncoming vehicle N is not traveling on a curve. When it is determined that the own vehicle M or the oncoming vehicle N is traveling on a curve, the transfer prediction time setting unit may always set only the first transfer prediction time to the shorter time, or set only the second transfer prediction time to the shorter time. In another example, when it is determined that the own vehicle M or the oncoming vehicle N is traveling on a curve, the transfer prediction time setting unit 24 may always set both of the first transfer prediction time and the second transfer prediction time to the shorter time. The first transfer prediction time and the second transfer prediction time may be the same length of time or different lengths of time.

The transfer prediction time setting unit 24 may set the transfer prediction time corresponding to one of the own vehicle M and the oncoming vehicle N which is determined as being traveling on a curve, to the shorter time. Namely, when the own-vehicle curve traveling determining unit 22 determines that the own vehicle M is traveling on a curve, the transfer prediction time setting unit 24 sets the first transfer prediction time to the shorter time, and sets the second transfer prediction time to the normal time. When the oncoming-vehicle curve traveling determining unit 23 determines that the oncoming vehicle N is traveling on a curve, the transfer prediction time setting unit 24 sets the first transfer prediction time to the normal time, and sets the second transfer prediction time to the shorter time.

The transfer prediction time setting unit 24 may basically set the first transfer prediction time of the own vehicle M and the second transfer prediction time of the oncoming vehicle N to the normal time, and may set at least one of the first transfer prediction time of the own vehicle M or the second transfer prediction time of the oncoming vehicle N to the shorter time, only when at least one of the own vehicle M or the oncoming vehicle N is traveling on a curve.

The own vehicle course calculating unit 25 calculates the own vehicle course from the vehicle speed and traveling direction of the own vehicle M, based on vehicle speed information of the vehicle speed sensor 5, yaw rate information of the yaw rate sensor 7, and the first transfer prediction time set by the transfer prediction time setting unit 24, for example. The own vehicle course calculating unit 25 calculates the own vehicle course along which the own vehicle M is expected to proceed during the first transfer prediction time while keeping the current vehicle speed and traveling direction, for example.

The own vehicle course calculating unit 25 may further calculate the own vehicle course in view of change of the traveling direction, based on steering information of the steering sensor 8 (see the own vehicle course Cm3 of FIG. 6B). In another example, the own vehicle course calculating unit 25 may calculate the own vehicle course along which the own vehicle M is expected to proceed during the first transfer prediction time while keeping the current acceleration, based on acceleration information of the acceleration sensor 6, as well as the vehicle speed information of the vehicle speed sensor 5. In addition, the own vehicle course calculating unit 25 may calculate the own vehicle course by known methods.

The own vehicle course calculating unit 25 also calculates time-dependent own vehicle positions on the own vehicle course, as well as the own vehicle course. The own vehicle course calculating unit 25 calculates own vehicle positions at which the own vehicle is expected to be located at intervals of a preset time on the own vehicle course, based on vehicle-speed information of the vehicle speed sensor 5, for example (see FIG. 3). For the own vehicle position, a range corresponding to the size of the own vehicle M is set, for example.

The oncoming vehicle course calculating unit 26 calculates the oncoming vehicle course, based on obstacle information of the laser radar 4 and the second transfer prediction time set by the transfer prediction time setting unit 24, for example. The oncoming vehicle course calculating unit 26 calculates the oncoming vehicle course along which the oncoming vehicle N is expected to proceed during the second transfer prediction time while keeping the vehicle speed and traveling direction (direction of the velocity vector) of the oncoming vehicle N obtained from the obstacle information of the laser radar 4, for example. The oncoming vehicle course calculating unit 26 may calculate the oncoming vehicle course from the vehicle speed and traveling direction of the oncoming vehicle N obtained from the oncoming vehicle N via inter-vehicle communications of the communication unit 9. In addition, the oncoming vehicle course calculating unit 26 may calculate the own vehicle course by known methods.

The oncoming vehicle course calculating unit 26 also calculates time-dependent oncoming vehicle positions on the oncoming vehicle course. The oncoming vehicle course calculating unit 26 calculates oncoming vehicle positions at which the oncoming vehicle is expected to be located at intervals of a preset time on the oncoming vehicle course, from the vehicle speed of the oncoming vehicle N, based on the obstacle information of the laser radar 4, for example (see FIG. 3). For the oncoming vehicle position, a range corresponding to the estimated size of the oncoming vehicle N is set, based on the image captured by the vehicle-mounted camera 3 or the obstacle information of the laser radar 4, for example. The oncoming vehicle course calculating unit 26 estimates the size of the oncoming vehicle N, based on the image captured by the vehicle-mounted camera 3 or the obstacle information of the laser radar 4, by a known method, for example. The oncoming vehicle course calculating unit 26 does not necessarily estimate the size of the oncoming vehicle N, but may employ a preset range as the range of the oncoming vehicle position.

The determining unit 27 determines whether there is any point in time at which one of the own vehicle positions on the own vehicle course calculated by the own vehicle course calculating unit 25 overlaps a corresponding one of the oncoming vehicle positions on the oncoming vehicle course calculated by the oncoming vehicle course calculating unit 26. When the range of the own vehicle position M4 at a certain point in time overlaps the range of the oncoming vehicle position N4 at the same point in time in a plan view, as shown in FIG. 3, for example, the determining unit 27 determines that there is a point in time at which one of the own vehicle positions on the own vehicle course overlaps a corresponding one of the oncoming vehicle positions on the oncoming vehicle course.

When the determining unit 27 determines that there is a point in time at which one of the own vehicle positions on the own vehicle course overlaps a corresponding one of the oncoming vehicle positions on the oncoming vehicle course, the avoidance control unit 28 performs avoidance control for avoiding a collision between the oncoming vehicle N and the own vehicle M. As one example of the avoidance control, the avoidance control unit 28 transmits a control signal to the HMI 11. The HMI 11 gives a warning concerning the oncoming vehicle N to the driver via an image output or a voice output, based on the control signal from the avoidance control unit 28. As another example of the avoidance control, the avoidance control unit 28 may transmit a control signal to an actuator (such as a throttle actuator, a brake actuator, and a steering actuator) for controlling traveling of the own vehicle M. In this case, the actuator performs steering control or speed reduction control on the own vehicle M, based on the control signal from the avoidance control unit 28.

Figure 7A:
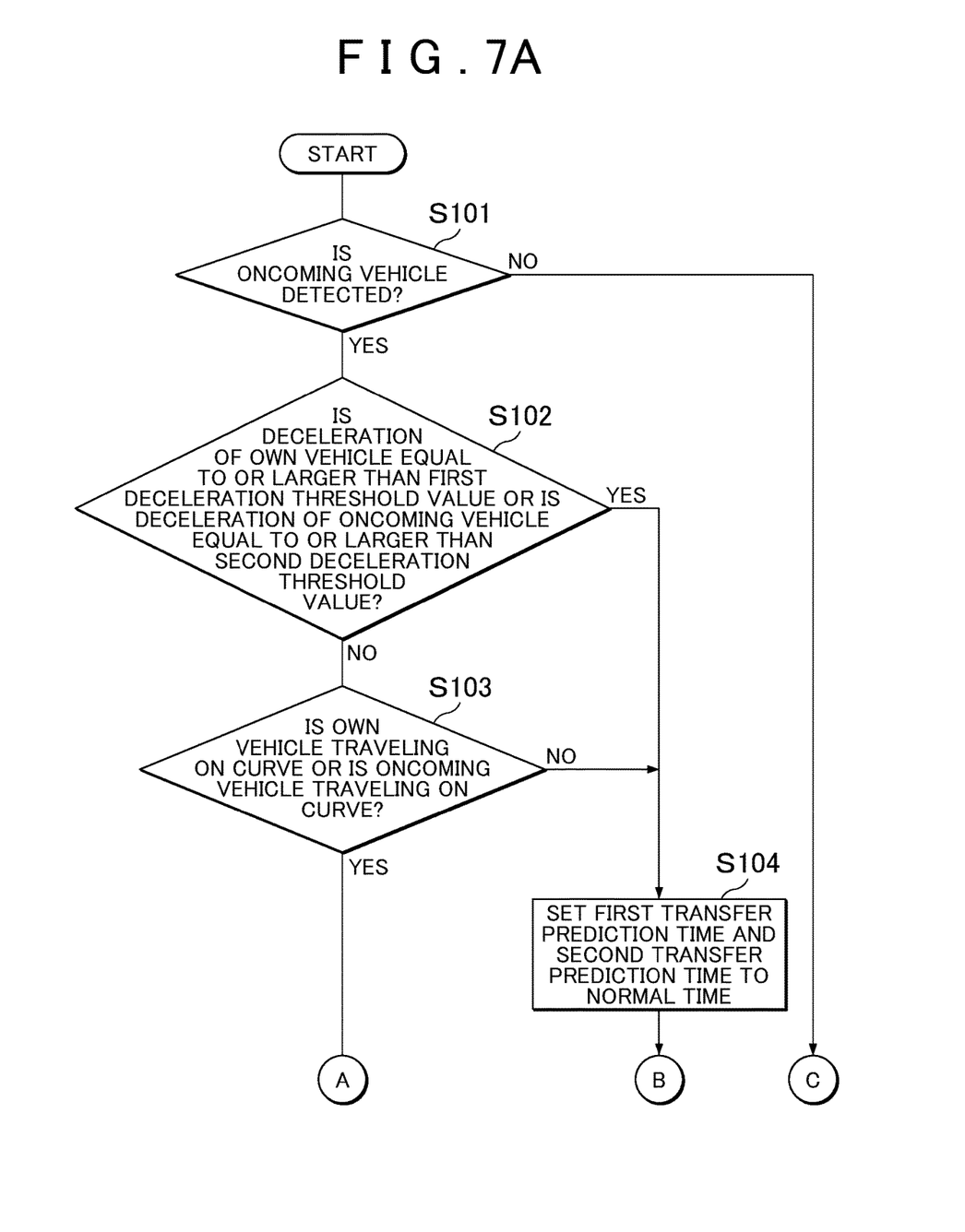
FIG. 7A is a flowchart illustrating a collision avoidance control method of the collision avoidance control system according to the embodiment of FIG. 1.
Figure 7B:
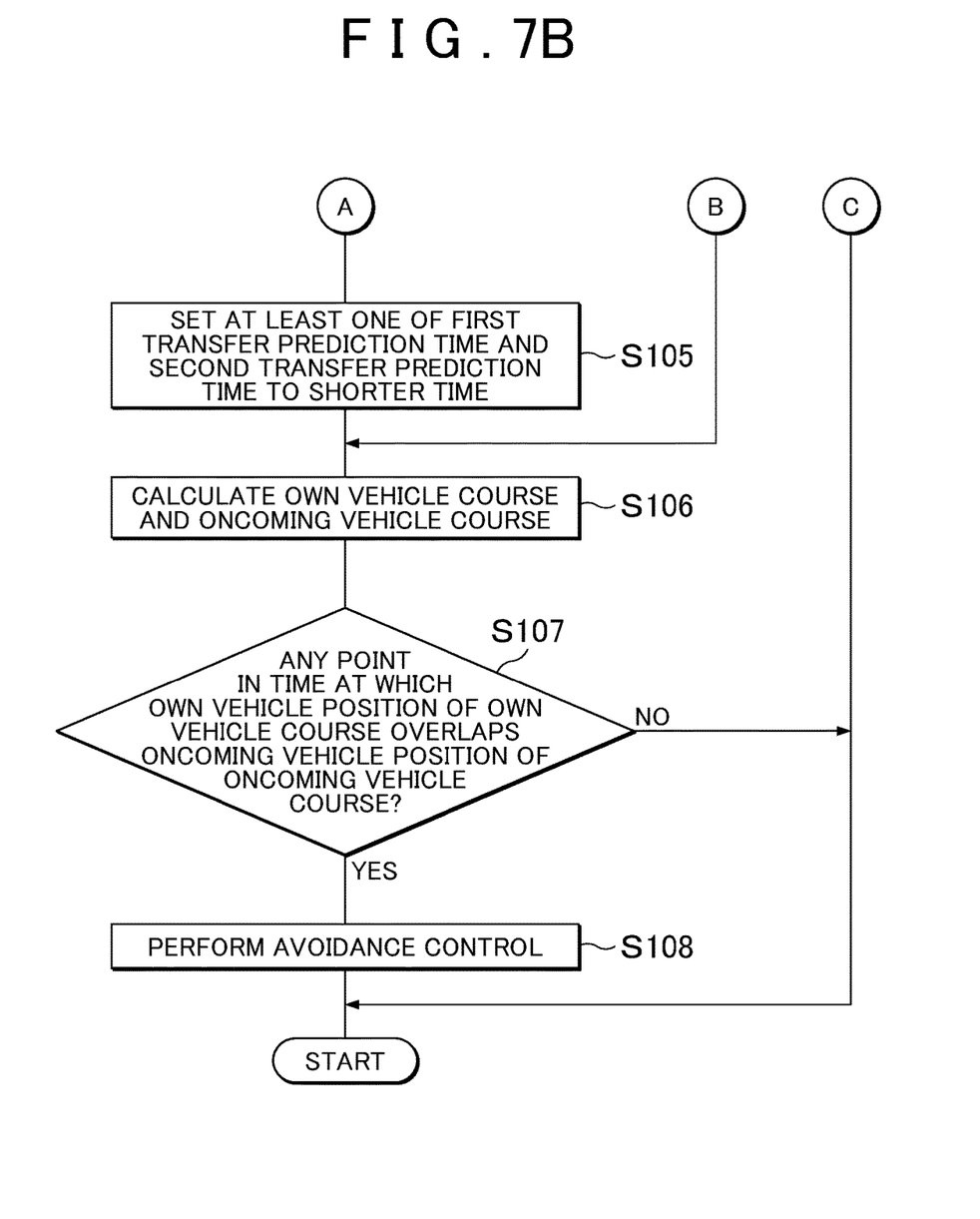
FIG. 7B is a flowchart illustrating a collision avoidance control method of the collision avoidance control system according to the embodiment of FIG. 1.

Next, a collision avoidance control method of the collision avoidance control system 1 according to this embodiment will be described with reference to FIG. 7A and FIG. 7B. FIG. 7A and FIG. 7B are a flowchart illustrating the collision avoidance control method of the collision avoidance control system 1 according to this embodiment.

As shown in FIG. 7A and FIG. 7B, the ECU 2 of the collision avoidance control system 1 causes the oncoming vehicle detecting unit 20 to detect an oncoming vehicle N in step S101. The oncoming vehicle detecting unit 20 detects the oncoming vehicle N traveling in a direction opposite to that of the own vehicle M, based on obstacle information of the laser radar 4, for example. If no oncoming vehicle N is detected (S101: NO), the ECU 2 finishes the current cycle of the routine. Then, the ECU 2 executes step S101 again, after a lapse of a preset time (e.g., a period of time corresponding to the clock cycle of the ECU 2). When the oncoming vehicle N is detected (S101: YES), the ECU 2 goes to step S102.

In step S102, the ECU 2 causes the deceleration determining unit 21 to determine whether the deceleration of the own vehicle M is equal to or larger than the first deceleration threshold value, and determine whether the deceleration of the oncoming vehicle N is equal to or larger than the second deceleration threshold value. If the deceleration determining unit 21 determines that the deceleration of the own vehicle M is not equal to nor larger than the first deceleration threshold value, and determines that the deceleration of the oncoming vehicle N is not equal to nor larger than the second deceleration threshold value (S102: NO), the ECU 2 goes to step S103. When the deceleration determining unit 21 determines that the deceleration of the own vehicle M is equal to or larger than the first deceleration threshold value, or determines that the deceleration of the oncoming vehicle N is equal to or larger than the second deceleration threshold value (S102: YES), the ECU 2 goes to step S104.

Step S102 and step S103 may be changed in order. Also, step S102 is not necessarily executed, and step S102 may be eliminated.

In step S103, the ECU 2 causes the own-vehicle curve traveling determining unit 22 to determine whether the own vehicle M is traveling on a curve, and causes the oncoming-vehicle curve traveling determining unit 23 to determine whether the oncoming vehicle N is traveling on a curve. The own-vehicle curve traveling determining unit 22 determines whether the own vehicle M is traveling on a curve, based on steering information of the steering sensor 8, for example. The oncoming-vehicle curve traveling determining unit 23 determines whether the oncoming vehicle N is traveling on a curve, based on obstacle information of the laser radar 4, for example. If it is determined that neither of the own vehicle M and the oncoming vehicle N is traveling on a curve (S103: NO), the ECU 2 goes to step S104. If it is determined that the own vehicle M or the oncoming vehicle N is traveling on a curve (S103: YES), the ECU 2 goes to step S105.

In step S104, the ECU 2 causes the transfer prediction time setting unit 24 to set the first transfer prediction time and the second transfer prediction time to the normal time. When the first transfer prediction time and the second transfer prediction time are set by default (initially set) to the normal time, there is no need to provide step S104. After setting the first transfer prediction time and the second transfer prediction time, the ECU 2 proceeds to step S106.

In step S105, the ECU 2 causes the transfer prediction time setting unit 24 to set at least one of the first transfer prediction time or the second transfer prediction time to the shorter length of time than the normal time. The transfer prediction time setting unit 24 may shorten the transfer prediction time corresponding to one or both of the own vehicle M and the oncoming vehicle N which is/are determined as being traveling on a curve.

Namely, if it is determined that the own vehicle M is traveling on a curve, and it is determined that the oncoming vehicle N is not traveling on a curve, for example, the transfer prediction time setting unit 24 sets the first transfer prediction time of the own vehicle M to the shorter time, and sets the second transfer prediction time of the oncoming vehicle N to the normal time. On the other hand, if it is determined that the own vehicle M is not traveling on a curve, and the oncoming vehicle N is traveling on a curve, for example, the transfer prediction time setting unit 24 sets the first transfer prediction time of the own vehicle M to the normal time, and sets the second transfer prediction time of the oncoming vehicle N to the shorter time. Also, if it is determined that both of the own vehicle M and the oncoming vehicle N are traveling on a curve, the transfer prediction time setting unit 24 sets both of the first transfer prediction time of the own vehicle M and the second transfer prediction time of the oncoming vehicle N to the shorter time.

The transfer prediction time setting unit 24 may also set only the first transfer prediction time of the own vehicle M to the shorter time, irrespective of the vehicle that is determined as being traveling on a curve. The transfer prediction time setting unit 24 may also set only the second transfer prediction time of the oncoming vehicle N to the shorter time, irrespective of the vehicle that is determined as being traveling on a curve. Also, the transfer prediction time setting unit 24 may set both of the first transfer prediction time of the own vehicle M and the second transfer prediction time of the oncoming vehicle N to the shorter time, irrespective of the vehicle that is determined as being traveling on a curve.

When the transfer prediction time setting unit 24 sets the first transfer prediction time and the second transfer prediction time to the normal time by default, the unit 24 may set (change) only the transfer prediction time to be reduced. The ECU 2 goes to step S106 after setting the first transfer prediction time of the own vehicle M and the second transfer prediction time of the oncoming vehicle N.

In step S106, the ECU 2 causes the own vehicle course calculating unit 25 to calculate the own vehicle course, and cause the oncoming vehicle course calculating unit 26 to calculate the oncoming vehicle course. The own vehicle course calculating unit 25 calculates the own vehicle course along which the own vehicle M is expected to proceed during the first transfer prediction time, based on vehicle speed information of the vehicle speed sensor 5, yaw rate information of the yaw rate sensor 7, and the first transfer prediction time, for example. The own vehicle course calculating unit 25 calculates time-dependent own vehicle positions on the own vehicle course, as well as the own vehicle course.

Similarly, the oncoming vehicle course calculating unit 26 calculates the oncoming vehicle course along which the oncoming vehicle N is expected to proceed during the second transfer prediction time, based on obstacle information of the laser radar 4 and the second transfer prediction time, for example. The oncoming vehicle course calculating unit 26 calculates time-dependent oncoming vehicle positions on the oncoming vehicle course, as well as the oncoming vehicle course. After calculation of the own vehicle course and the oncoming vehicle course, the ECU 2 goes to step S107.

In step S107, the ECU 2 causes the determining unit 27 to determine whether there is any point in time at which one of the own vehicle positions on the own vehicle course overlaps a corresponding one of the oncoming vehicle positions on the oncoming vehicle course. If the determining unit 27 determines that there is no point in time at which one of the own vehicle positions on the own vehicle course overlaps a corresponding one of the oncoming vehicle positions on the oncoming vehicle course (S107: NO), the ECU 2 finishes the current cycle of the routine. Then, the ECU 2 executes step S101 again, after a lapse of a preset time. If the determining unit 27 determines that there is no point in time at which one of the own vehicle positions on the own vehicle course overlaps a corresponding one of the oncoming vehicle positions on the oncoming vehicle course, even if the own vehicle course and the oncoming vehicle course intersect with each other, the ECU 2 makes a negative decision (NO) in step S107. On the other hand, if the determining unit 27 determines that there is a point in time at which one of the own vehicle positions on the own vehicle course overlaps a corresponding one of the oncoming vehicle positions on the oncoming vehicle course (S107: YES), the ECU 2 goes to step S108.

In step S108, the ECU 2 causes the avoidance control unit 28 to perform avoidance control. The avoidance control unit 28 issues a warning concerning the oncoming vehicle N as avoidance control, by transmitting a control signal to the HMI 11, for example. When the warning concerning the oncoming vehicle N is issued, for example, the ECU 2 finishes processing concerning the oncoming vehicle N.

In the collision avoidance control system 1 according to this embodiment as described above, when it is determined that the own vehicle M or the oncoming vehicle N is traveling on a curve, at least one of the first transfer prediction time or the second transfer prediction time is set to the shorter time, as compared with the case where it is determined that neither of the own vehicle M and the oncoming vehicle N is traveling on a curve. Thus, according to the collision avoidance control system 1, when the own vehicle M or the oncoming vehicle N is traveling on a curve, at least one of the calculated own vehicle course or oncoming vehicle course is shortened. Therefore, it is less likely to be determined that there is a point in time at which one of the own vehicle positions on the own vehicle course overlaps a corresponding one of the oncoming vehicle positions on the oncoming vehicle course, as compared with the case where the own vehicle course and the oncoming vehicle course are not shortened, and unnecessary avoidance control associated with the oncoming vehicle N is less likely or unlikely to be performed.

In the collision avoidance control system 1, the transfer prediction time of one of the own vehicle M and the oncoming vehicle N which is traveling on a curve is set to the shorter time, so that unnecessary avoidance control in connection with curve traveling can be curbed while an appropriate collision determination can be made with respect to the vehicle that is not traveling on a curve.

Further, in the collision avoidance control system 1, it is not desirable to reduce chances of avoidance control during rapid deceleration; therefore, when it is determined that the deceleration of the own vehicle is equal to or larger than the first deceleration threshold value, or the deceleration of the oncoming vehicle is equal to or larger than the second deceleration threshold value, each of the first transfer prediction time and the second transfer prediction time is set to a preset normal time, so that appropriate chances of avoidance control can be ensured.

While one embodiment of the invention has been described, the invention is not limited to the above-described embodiment. Starting with the above-described embodiment, this invention may be embodied in various forms with various changes and improvements, based on the knowledge of those skilled in the art. The collision avoidance control system 1 may change the first transfer prediction time or the second transfer prediction time, according to a condition or conditions other than determination on curve traveling.

What is claimed is:

1. A collision avoidance control system comprising an ECU configured to:
   detect an oncoming vehicle;
   perform avoidance control, the avoidance control being control for avoiding a collision between the oncoming vehicle and an own vehicle;
   determine whether the own vehicle is traveling on a curve;
   determine whether the oncoming vehicle is traveling on a curve, based on a result of the detection;
   setting a first transfer prediction time and a second transfer prediction time, such that at least one of the first transfer prediction time or the second transfer prediction time is set to a shorter time when it is determined that at least one of the own vehicle or the oncoming vehicle is traveling on a curve, as compared with a time when neither of the own vehicle and the oncoming vehicle is traveling on a curve;
   calculate an own vehicle course and time-dependent own vehicle positions on the own vehicle course, based on a traveling direction of the own vehicle and a vehicle speed of the own vehicle, the own vehicle course being a course along which the own vehicle is expected to proceed during the first transfer prediction time;
   calculate an oncoming vehicle course and time-depending oncoming vehicle positions on the oncoming vehicle course, based on the result of the detection, the oncoming vehicle course being a course along which the oncoming vehicle is expected to proceed during the second transfer prediction time;
   determine whether there is a point in time at which one of the own vehicle positions on the own vehicle course overlaps a corresponding one of the oncoming vehicle positions on the oncoming vehicle course; and
   perform the avoidance control when it is determined that there is a point in time at which one of the own vehicle positions overlaps a corresponding one of the oncoming vehicle positions, wherein
   when it is determined that the own vehicle is traveling on a curve, the ECU sets the first transfer prediction time to the shorter time, as compared with a time when it is determined that the own vehicle is not traveling on a curve;
   when it is determined that the oncoming vehicle is traveling on a curve, the ECU sets the second transfer prediction time to the shorter time, as compared with a time when it is determined that the oncoming vehicle is not traveling on a curve.

2. The collision avoidance control system according to claim 1, wherein
   the ECU determines a deceleration of the own vehicle based on a sensor;
   the ECU determines a deceleration of the oncoming vehicle based on a radar;
   the ECU determines whether the deceleration of the own vehicle is equal to or larger than a first deceleration threshold value, and determines whether the deceleration of the oncoming vehicle is equal to or larger than a second deceleration threshold value, based on a the result of the detection; and
   when it is determined that the deceleration of the own vehicle is equal to or larger than the first deceleration threshold value, or when it is determined that the deceleration of the oncoming vehicle is equal to or larger than the second deceleration threshold value, each of the first transfer prediction time and the second transfer predicted time is set to a preset time, irrespective of a result of determination as to whether the own vehicle is traveling on a curve, and a result of determination as to whether the oncoming vehicle is traveling on a curve.

3. A control method of a collision avoidance control system, the collision avoidance control system including an ECU, the control method comprising:
   detecting an oncoming vehicle by the ECU;
   setting a first transfer prediction time and a second transfer prediction time, such that at least one of the first transfer prediction time or the second transfer prediction time is set to a shorter time when a first condition and a second condition are satisfied, as compared with a time when at least one of the first condition or the second condition is not satisfied, the first condition being that a deceleration of the own vehicle is smaller than a first deceleration threshold value, and a deceleration of the oncoming vehicle is smaller than a second deceleration threshold value, the second condition being that the own vehicle is traveling on a curve, or the oncoming vehicle is traveling on a curve;
   calculating an own vehicle course and an oncoming vehicle course by the ECU, the own vehicle course being a course along which the own vehicle is expected to proceed during the first transfer prediction time, the oncoming vehicle course being a course along which the oncoming vehicle is expected to proceed during the second transfer prediction time; and
   performing avoidance control of the own vehicle by the ECU when there is a point in time at which one of own vehicle positions overlaps a corresponding one of the oncoming vehicle positions, the avoidance control being control for avoiding a collision between the oncoming vehicle and the own vehicle, wherein
   when it is determined that the own vehicle is traveling on a curve, setting the first transfer prediction time to the shorter time by the ECU, as compared with a time when it is determined that the own vehicle is not traveling on a curve;
   when it is determined that the oncoming vehicle is traveling on a curve, setting the second transfer prediction time to the shorter time by the ECU, as compared with a time when it is determined that the oncoming vehicle is not traveling on a curve.

* * * * *